April 29, 1941.  H. G. HENRY  2,239,676
SIGNALING DEVICE
Filed June 12, 1939
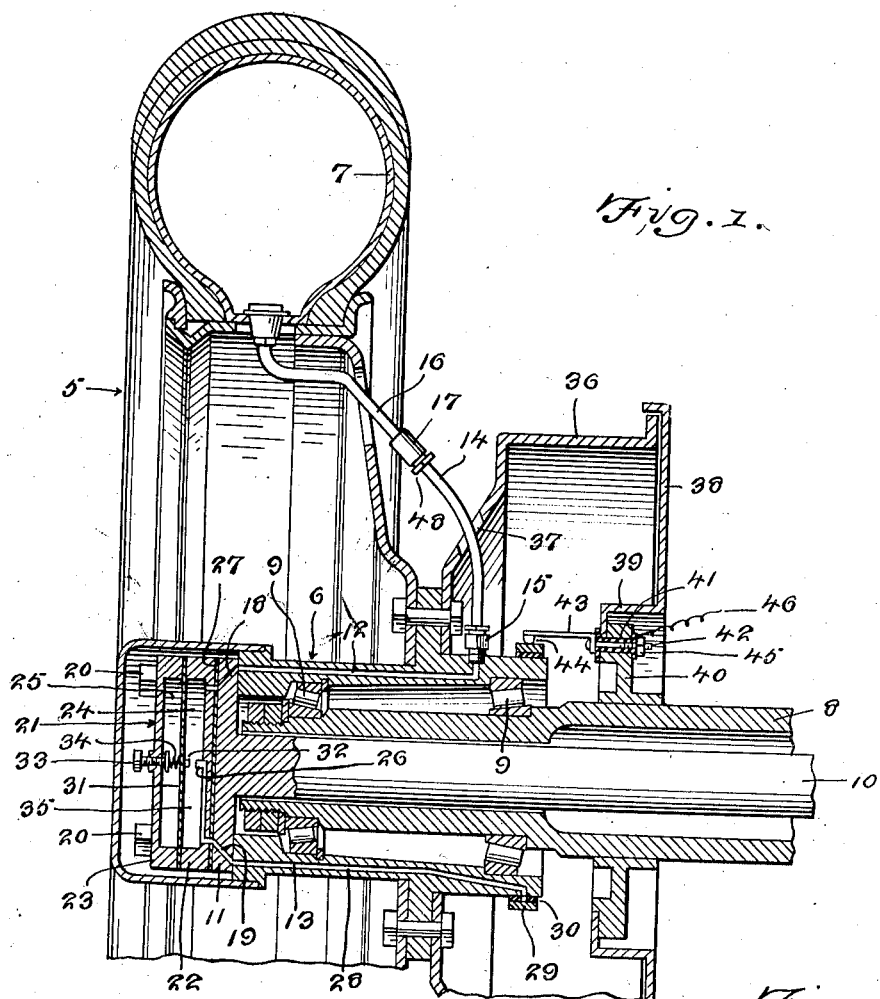
Harold G. Henry INVENTOR
BY Victor J. Evans & Co.
ATTORNEYS Patented Apr. 29, 1941

2,239,676

UNITED STATES PATENT OFFICE 2,239,676

SIGNALING DEVICE

Harold G. Henry, King City, Calif.

Application June 12, 1939, Serial No. 278,787

2 Claims. (Cl. 200—58)

My invention relates to devices for indicating when the pressure of motor vehicle tires and the like is below the proper operating point.

One of the principal objects of my invention is to provide a simple and efficient means for indicating when the air pressure in a tire is below the proper operating point.

Another object of my invention is to provide means of the character described whereby to effect both an audible and visual signal when the pressure is below the proper operating point.

A further object of my invention is to provide a device of the character described which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a longitudinal sectional view of my invention illustrating the latter in connected relation with a pneumatic tire.

Figure 2 is a detail sectional view of the connection between the valve casing and conduit.

Figure 3 is a diagrammatic view illustrating the circuit of the signal system.

In practicing my invention, as illustrated in the drawing, I provide a motor vehicle wheel having a hub 6 and equipped with a pneumatic tire having an inner tube 7 of ordinary construction. The hub 6 is mounted for rotation on the gudgeon of an axle housing 8 by means of roller bearing assemblies 9. Extending through the axle housing 8 is an axle 10 for rotation relative to said housing and said axle is fashioned on the outer end thereof with a head 11. The rear face of the head abuts the outer end 6 of the hub as clearly illustrated in Figure 1 of the drawing. The hub 6 is formed with a pair of longitudinally extending air and conduit passages 12 and 13 respectively.

The rear end of the air passage 12 communicates with the inner tube 7 by means of a conduit 14. One end of the conduit 14 is connected to the hub for communication with the passage 12 by means of an adapter 15 while the opposite end of the conduit is connected to the end of the valve casing 16 of the inner tube by means of a swivel sleeve 17 to facilitate detachment of the conduit and which is hereinafter more fully described.

The head 11 is provided with apertures 18 and 19 extending therethrough and communicating with the passages 12 and 13 respectively. The outer face of the head 11 has connected thereto, by means of bolts 20, a diaphragm assembly 21 comprising a pair of inner and outer plates 22 and 23 respectively.

The plates are fashioned on their adjacent or opposed faces with registering recesses 24 and 25 respectively and the plate 22 is fashioned with a radially extending slot terminating at one end in a passage effecting communication with the passage 19 and on the opposite end in a recess in which is mounted and insulated from said plate a contact member 26 centrally disposed in the recess 24. Interposed between the plate 22 and the head 11 is a gasket 27 to insure a tight fit therebetween. An insulated cable or wire 28 has one end connected to the contact member 26 and extends through the slot in the head, aperture 19 and passage 13 and outwardly through the hub adjacent the rear end of the latter. The opposite end of the wire 28, which extends outwardly through the hub, adjacent the rear end thereof is connected to a collector ring 29 mounted on the rear end of the hub and spaced from the latter by means of an insulating ring 30. From the foregoing it will be apparent that the wire 28 provides an electrical connection between the contact member 26 and the collector ring 29 and which is insulated with respect to the hub and the other parts associated therewith.

Interposed between the inner and outer plates 22 and 23 is a disk-shaped metallic diaphragm 31 equipped on the rear face with a contact member 32 for engagement with the contact member 26 as hereinafter set forth. The outer plate 23 is provided with a set screw 33 extending centrally therethrough and said set screw engages the front end of a coil spring 34.

The rear end of the coil spring 34 engages the front face of the diaphragm 31 and tends to urge the diaphragm towards the contact member 26. The diaphragm 31 serves as a partition between the recesses 24 and 25 of the plates 22 and 23 and forms a pressure chamber 35 within the recess 24 whereby air pressure from the inner tube 7 is maintained therein through the medium of the conduit 14 and passage 12. Obviously, the tension of the spring 34 may be adjusted by the set screw 33 to permit a predetermined amount of air pressure to maintain the contact members 32 and 26 in spaced relation through the medium of the diaphragm 31. Lowering of the air pressure within the tube 7 likewise lowers the pressure in the chamber 35 and permits the spring 34 to flex the diaphragm towards the head 11 and cause engagement of the contact members 32 and 26. The diaphragm and its contact member 32 are grounded through the hub and associated parts to one terminal of a battery as hereinafter set forth.

The hub 6 has attached thereto a brake drum 36 provided in the front face with an aperture 37 through which the conduit 14 extends. The rear end of the brake drum 36 is closed by a disk 38, the latter being fashioned with an inwardly disposed offset section 39 fixed to a collar 40 secured to the stationary axle housing 8 whereby the hub 6 and brake drum 36 rotate relative to the disk 38 and collar 40. The collar 40 has extending therethrough a sleeve 41 of insulating material in which is encased a binding post 42.

The front end of the binding post 42 has connected thereto a contact arm 43, the outer end of which is provided with a contact member 44 for rotatable engagement with the collector ring 29. The rear end of the binding post has connected thereto, by means of a nut 45, one end of a wire 46. The opposite end of the wire 46 is connected within a signal circuit hereinafter described and illustrated diagrammatically in Figure 3 of the drawing.

The end of the conduit forming connection with the sleeve 17 is provided with a flared end or head 47, the latter being retained and loosely mounted within a recess in said sleeve by means of a nut 48 threaded into said recess. The sleeve 17 is provided with a transversely extending pin 49 and with a threaded end threadedly connected to the threaded end of the valve casing 16 as clearly illustrated in Figure 2. When the sleeve 17 is threadedly connected to the valve casing 16, the pin 49 serves to maintain the valve stem 50 in open position thereby effecting open communication between the tube 7 and passage 12. It is to be understood that my invention is applicable to each wheel of a motor vehicle equipped with pneumatic tires and that when said wheels are so equipped a signal lamp 51 is provided for each wheel and each having a terminal connected to the respective wires 46 and with their other terminals connected together and to one terminal of a buzzer 52.

The opposite terminal of the buzzer is connected to one terminal of a battery B. The other terminal of the battery B is grounded and forms a connection with the diaphragm 31 as heretofore described. Each of the wires 46 have interposed therein a switch 53 and likewise the wire connecting the buzzer to the battery is provided with a switch 54. Closing of any of the switches 53 together with the switch 54 will indicate whether the pressure in the respective inner tube is below a desired amount for the reason that when the pressure is below a desired amount the contact members 32 and 26 will be engaged and the respective lamp 51 will be illuminated and the buzzer 52 sounded.

From the foregoing it will be apparent that I have provided a simple and efficient means whereby it may be determined whether the inner tube of a tire is deflated by means of both a visual and audible signal.

It is obvious that the invention is not confined to the herein described use therefor as it may be utilized for any purpose to which it is adaptable. It is therefore to be understood that invention is not limited to the specific construction as illustrated and described, as the same is only illustrative of the principles of operation, which are capable of extended application in advance forms, and that the invention comprehends all construction within the scope of the appended claims.

What I claim is:

1. In combination with a hub formed with an air passage for communication with an inner tube and mounted for rotation on the gudgeon of an axle housing having journaled therein an axle rotatable with said hub and with said axle equipped with a contact member, a diaphragm casing fixed on said axle and formed with a chamber communicating with said passage, a diaphragm mounted in said casing and provided with a contact member for engagement with said first mentioned contact member, said diaphragm being responsive to air pressure in said chamber to make and break contact between said contact members, and means carried by said casing for flexing said diaphragm to effect engagement of said contact members upon lowering of said air pressure in said chamber.

2. In combination with a hub formed with an air passage for communication with an inner tube and mounted for rotation on the gudgeon of an axle housing having journaled therein an axle rotatable with the said hub and with the said axle equipped with a contact member, a diaphragm casing fixed on said axle and formed with a chamber communicating with the said passage, a diaphragm mounted in the said casing and provided with a contact member for engagement with the said first-mentioned contact member, said diaphragm being responsive to air pressure in the chamber to make and break contact between the said contact members, a set screw adjustably carried by the said casing, a spring interposed between the set screw and the diaphragm for yieldingly flexing the latter so as to effect engagement of the complementary contacts upon the lowering of the air pressure in the said chamber.

HAROLD G. HENRY.